Patented Feb. 20, 1951

2,542,604

UNITED STATES PATENT OFFICE 2,542,604

EXTREME PRESSURE LUBRICANT AND EXTREME PRESSURE AGENTS THEREFOR

Charles A. Weisel, Somerville, and Elmer B. Cyphers, Cranford, N. J., assignors to Standard Oil Development Company, a corporation of Delaware No Drawing. Application December 1, 1948, Serial No. 62,981

5 Claims. (Cl. 252—49.9)

This invention relates to extreme pressure lubricants and particularly to lubricating compositions which have extreme pressure properties imparted to them by the addition of the reaction products of chlorinated hydrocarbons with phosphorus sulfides, halides or oxides.

It has been known in the prior art that chlorinated organic compounds of various types have certain load-carrying properties when added to lubricating oils. For example, it is known that chlorinated phenol, such as pentachlorphenol, when added to mineral oil compositions, increases film strength and wear-resisting properties.

The present invention is based on the discovery that materials of this general type may be further improved in the properties mentioned by modifying the molecular structure to incorporate phosphorus therein. A wide variety of phosphate esters containing the pentachlorphenyl radical

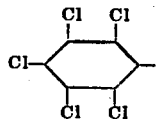

may be obtained for this purpose. For example, pentachlorphenol may be reacted with $POCl_3$ in the presence of pyridine to form a reaction product containing phosphorus which has good film strength and wearresisting properties. This reaction proceeds according to the following typical equation:

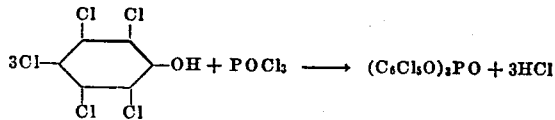

The product of the above reaction possesses low solubility in mineral oil. By including an alcohol in the reaction mixture, the solubility is improved, the reaction proceeding according to the following equation:

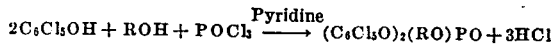

In the foregoing equation, R may be alkyl, alkenyl, an alicyclic radical, or a partially halogenated radical of any of these types.

By controlling the amounts of reactants used, different reaction products may be obtained, as is illustrated in the following equations where $\phi = C_6Cl_5-$ R = alkyl, alkenyl, alicyclic radical, or halogenated radical

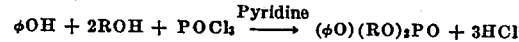
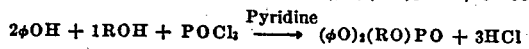
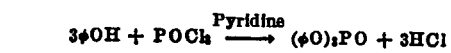

It is understood that any of the above products may be present. Some $(RO)_3PO$ may also be present in the product. The predominant or major product is dependent on the quantities of materials used.

Instead of using $POCl_3$, a phosphorus sulfide may be used, for example, phosphorus pentasulfide. In this case, the reaction may be typified by the following equations:

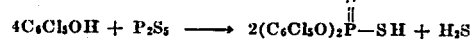

In the reaction of pentachlorphenol with the phosphorus sulfides, the reaction products may possess limited solubility in oil. By incorporating an aliphatic alcohol ROH where R is an alkyl, alkenyl, alicyclic or halogenated radical, as may be done in the reaction with $POCl_3$ described above, the solubility is increased. If such an alcohol is incorporated into the molecule, a mixture of products will be obtained which will include

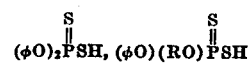

and possibly some

where $\phi$ and R represent the aforementioned radicals. By controlling the amounts of reactants used, a product having predominantly the structure of one of the above equations may be obtained.

The above materials may also possess fungicidal and insecticidal properties.

The thiophosphate ester described above contains an acidic group which will react to form metal or $NH_4$ salts. Salts of Ba, C , Sr, Mg, Al and Cu+ are especially preferred as additives for lubricating oils. The metal salts produced according to this reaction appear to be valuable also as detergents and have value also as insecticides and fungicides.

The metal salts, especially those of alkali metals such as sodium, will react with various halides to form the complete ester. These reactions are illustrated in the following equation:

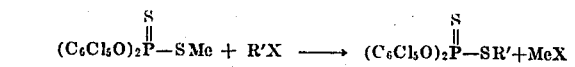

wherein Me is metal or ammonium, X is halogen, and R' is an alkyl, alkenyl, or alicyclic hydrocarbon or halogenated hydrocarbon radical.

The above equations are exemplary, but it will be understood that the invention is not limited in any way to the specific examples cited. For example, alkyl, alkenyl, or alicyclic substituted tetrachlorphenols and their derivatives may be used in lieu of pentachlorphenol with the same beneficial results.

In addition to various oxygen-containing products which may be obtained as above, related products may be obtained by using other compounds of phosphorus, sulfur and chlorine in lieu of POCl₃ and P₂S₅. Thus, PSCl₃ may obviously be substituted for POCl₃, P₂S₂O₃ may be substituted for P₂S₅, and other phosphorus sulfides and/or phosphorus sulfide-oxides may be used to prepare compounds which contain both oxygen and sulfur. The following types of compounds are contemplated as being within the scope of the invention.

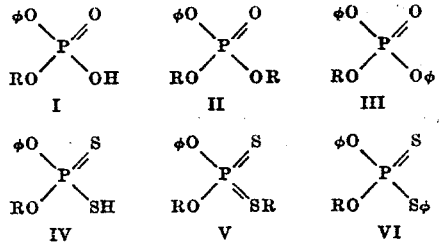

It will be noted that the left portion of the molecule, including P, is common to all these structures. The following general formula typifies the invention more broadly:

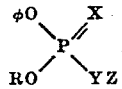

where $\phi$ is a chlorphenyl group, i. e., the chlorinated derivative of the hydrocarbon portion of a phenol, R is an alkyl hydrocarbon radical containing from 6 to 20 carbon atoms, X and Y are selected from the group consisting of oxygen and sulfur, and Z is selected from the group consisting of hydrogen, metal, ammonium, R and $\phi$, the metal being any of those described above, namely, the alkali metals and barium, calcium, strontium, magnesium, aluminum and copper.

The following data have been obtained to illustrate the invention set forth above.

*Example*

A mixed phosphate ester was prepared by using 2 mols of C₈ oxo alcohol and 1 mol of pentachlorphenol. To a mixture consisting of 107 grams of pentachlorphenol, 104 grams C₈ oxo alcohol, 96 grams of pyridine, 350 ml. benzene, and 200 ml. toluene chilled to 5° C., there was added dropwise over a period of about three hours 61.8 grams of phosphorus oxychloride (POCl₃). During the period while the POCl₃ was being added, the temperature of the solution was permitted to rise to 20° C. to facilitate solution of the pentachlorphenol. It was found necessary to add more benzene, about 100 ml., to keep the pyridine hydrochloride mixture fluid.

The foregoing mixture was permitted to stand overnight at room temperature and thereafter the mixture was refluxed for five hours and the solid material removed by filtration. The filtrate was washed with water and was dried over potassium carbonate and calcium chloride. The solvent and excess C₈ oxo alcohol were then removed by heating to 165° C. at a reduced pressure of 25 mm. The residual material weighed 170 grams. 27 grams of pentachlorphenol was recovered from the pyridine hydrochloride.

The residual product described above was analyzed and found to contain 4.96% phosphorus and 29.24% chlorine by weight. Calculated on a basis of

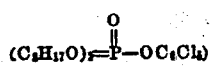

the theoretical phosphorus content would be 5.43% and the chlorine content 31.1% which was in reasonably close agreement.

The oxo alcohol employed in this example was prepared from a C₇ olefin cut obtained from the polymerization of olefins by phosphoric acid catalysis, by means of the oxo reaction of the olefin with carbon monoxide and hydrogen.

A 2% blend of the complex phosphate product having the theoretical formula just given, was prepared in a phenol extracted coastal stock lubricating oil of about 45 SSU viscosity at 210° F. This blend was evaluated in the standard Almen machine and in the Shell 4-Ball Extreme Pressure Tester. The data obtained, in comparison with the base stock and two standard commercial additives, are shown in the following table:

*Table I*

| Lubricant | Shell 4-Ball E. P. Tester 20 kg. Load, 30 min. Operation Wear Scar Diameter, mm. average of 2 Runs | Almen Machine Gradual Loading Weights Carried |
| --- | --- | --- |
| Phenol Ext. Coastal Stock 45 sec./210° F | 0.65 | 2-3 |
| +2% C₈ Oxo-Pentachlorphenol Phosphate | 0.27 | 10 |
| +2% Commercial Oiliness Agent (Fatty ester) | 0.52 | 4 |
| +2% Commercial Oiliness Agent (Tricresyl Phosphate) | 0.28 | 6 |

Other blends were also prepared using the residual product described above in a mineral oil composed of 45% steam refined cylinder oil having 220 SSU viscosity at 210° F. and 55% (by weight) of acid refined Mid-Continent stock of 50 SSU at 210° F. The data obtained on the standard S. A. E. machine and on the Timken machine are tabulated in the following table:

*Table II*

| Concentration of Additive in Mineral Oil | S. A. E. Machine Lbs. Carried at 1000 R. P. M. | Timken Machine | | |
| --- | --- | --- | --- | --- |
| | | Lbs. Load | Scar Width /64 ins. | Lbs./sq. in. |
| *Percent* | | | | |
| 10 | 292; 340 | 33 | 1.2 | 35,200 |
| 5 | 240; 225 | 33 | 1.95 | 22,700 |
| 5 | | 43 | 2.25 | 24,500 |
| None | 20-60 | 10 | 1.35 | 9,500 |

From the foregoing data, it is apparent that the phosphate prepared from 2 mols of C₈ oxo alcohol and 1 mol of pentachlorphenol is a particularly useful additive both under conditions of extreme pressure and under conditions where the applied load is more moderate. The complex phosphate possesses high load-carrying capacity as demonstrated by the excellent values obtained on the Almen, the S. A. E. and the Timken machines. The Shell 4-Ball test also indicates that the complex phosphate is very effective in decreasing wear. Numerous additives in the prior art have shown superior results on one or two of these tests, but it is considered exceptional to find a product which demonstrates excellent properties on all of them.

In addition to the excellent pressure properties set forth above, the product of the present invention may be varied slightly to produce an excellent rust inhibitor as well as to retain good film strength properties. Such a product also is useful for dispersing sludge in lubricating oil.

In particular, the ethers and esters of pentachlorphenol are effective, apparently because they have a high degree of polarity concentrated at one end of a long chain.

Thus, derivatives having the following general formulas are considered effective for the purpose of inhibiting rust and dispersing sludge:

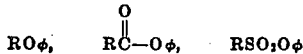

In each of the above formulas, R represents an alkyl or alkyl substituted aromatic group having an effective chain length of at least 6 carbon atoms in order to ensure oil solubility. The preferred chain length is from about 7 or 8 to 20 or more carbon atoms. Among the alcohols which may be employed are n-hexyl, 2-ethylhexyl, synthetic alcohols prepared from CO and hydrogen or from olefins, CO and hydrogen by means of the oxo reaction, dodecyl, octadecyl, oleyl, and mixtures of these and similar alcohols such as those derived by the hydrogenation of cocoanut oil and other natural fatty oil acids. The symbol $\phi$ in the above formulas represents the chlorinated hydrocarbon portion of a phenol, for example, the pentachlorphenyl group.

As previously mentioned, the active chlorinated organic group need not be limited to pentachlorphenol since various related materials may be substituted for this ingredient. Thus, various tetrachlorphenols and substituted chlorinated phenols such as chlorinated cresols and related alkylated derivatives of chlorinated phenols, for example, chlorinated isopropyl or tertiary butyl phenol or carvacrol, and the like, may be employed in lieu of pentachlorphenol. Compounds having the major proportion of chlorine attached to the ring are preferred by reason of their greater stability and less corrosive tendency.

When products of the type just described are used as minor constituents in mineral oils, such as crankcase lubricants and the like, they increase film strength to some degree and are particularly useful in dispersing sludge and preventing the formation of rust. Hence, they are useful additives for crankcase oils used in airplane engines or in any operation where conditions of high humidity and high temperature are encountered.

The modifying agent of the present invention may be used in various proportions and in various types of oils. Their utility is not limited to mineral base lubricating oils but they may be employed also in synthetic oils such as those incorporating the esters of polybasic acids, polyglycols and the like. In the following claims, the expression "oil," when not otherwise restricted, will be understood as referring generically to the synthetic oils as well as those of petroleum origin.

In general, useful quantities of the additive may vary from as little as 0.1 to as much as 20% by weight, based on the total composition. Proportions of 0.1 to 5% are preferred where oiliness is the preferred characteristic. Where extreme pressure lubrication is the paramount object, the proportions may be as high as 20% of additive. In case it is desired to market concentrates, the contact of additive may be considerably higher. The additives are useful in various grades of oil from the lightest lubricating grades (about 35 SSU at 210° F.) to those of high viscosity such as 1000 SSU at 210° F. They may also be used in greases and mixtures of mineral base and synthetic base oils, emulsifiable oils, and the like. Other conventional additives such as anti-oxidants, rust inhibitors, viscosity index improvers, pourpoint depressors, and the like, may be employed, as will be obvious to those skilled in the art.

What is claimed is:

1. A composition of matter having the general formula

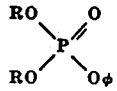

where R is an alkyl group of at least 6 and not more than 20 carbon atoms and $\phi$ is a pentachlorphenol radical.

2. A lubricating composition comprising 80 to 99.9% by weight of a lubricating oil selected from the class which consists of mineral base oil and synthetic oils of polybasic acid ester and polyglycol type and 0.1 to 20% of a material having the general formula

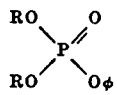

wherein R is an alkyl group of at least 6 and not more than 20 carbon atoms and $\phi$ is a pentachlorphenol radical.

3. A lubricating oil consisting essentially of a mineral base oil of 35 to 1000 SSU viscosity at 210° F. containing 0.1 to 20% by weight of a composition having the general formula

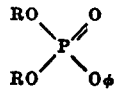

where R is an alkyl group of at least 6 and not more than 20 carbon atoms and $\phi$ is a pentachlorphenol radical.

4. A lubricating oil containing 0.1 to 20% by weight, based on the total composition, of a material having the general formula

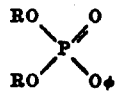

where R is an alkyl group of at least 6 and not more than 20 carbon atoms and $\phi$ is a pentachlorphenol radical, said lubricating oil comprising a synthetic oil selected from the class which consists of esters of polybasic acids and polyglycols.

5. A lubricating composition consisting essentially of mineral base lubricating oil containing about 2% by weight, based on the total composition, of a compound having the general formula

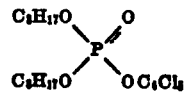

CHARLES A. WEISEL.
ELMER B. CYPHERS.

REFERENCES CITED

The following references are of record in the file of this patent:

UNITED STATES PATENTS

| Number | Name | Date |
|---|---|---|
| 2,033,916 | Bass | Mar. 17, 1936 |
| 2,223,329 | Moyle | Nov. 26, 1940 |
| 2,242,260 | Prutton | May 20, 1941 |
| 2,279,218 | Badertscher | Apr. 7, 1942 |